(12) United States Patent
Xia et al.

(10) Patent No.: US 8,184,390 B1
(45) Date of Patent: May 22, 2012

(54) DATA PATTERN DEPENDENT AMPLITUDE ADJUSTMENT

(75) Inventors: Haitao Xia, Mountain View, CA (US); Yenyu Hsieh, San Jose, CA (US)

(73) Assignee: Link_A_Media Devices Corporation, Santa Clara, CA (US)

( * ) Notice: Subject to any disclaimer, the term of this patent is extended or adjusted under 35 U.S.C. 154(b) by 158 days.

(21) Appl. No.: 12/592,343

(22) Filed: Nov. 23, 2009

Related U.S. Application Data

(60) Provisional application No. 61/200,838, filed on Dec. 3, 2008.

(51) Int. Cl.
   *G11B 20/14* (2006.01)

(52) U.S. Cl. ................ 360/43; 360/27; 360/39; 360/46; 360/51

(58) Field of Classification Search ........................ None
   See application file for complete search history.

(56) References Cited

U.S. PATENT DOCUMENTS

| | | | |
|---|---|---|---|
| 4,308,424 A * | 12/1981 | Bice, Jr ........................... 381/17 |
| 5,189,321 A * | 2/1993 | Seevinck ........................ 327/341 |
| 7,031,474 B1 * | 4/2006 | Yuen et al. ........................ 381/1 |
| 7,864,467 B2 * | 1/2011 | Eleftheriou et al. ............ 360/46 |

* cited by examiner

*Primary Examiner* — Jason Olson
(74) *Attorney, Agent, or Firm* — Van Pelt, Yi & James LLP

(57) ABSTRACT

Data is processed by receiving data having a value. The amplitude of the received data is adjusted using the processor based at least in part on the value of the received data to obtain modified data.

18 Claims, 8 Drawing Sheets

DATA PATTERN DEPENDENT AMPLITUDE ADJUSTMENT

CROSS REFERENCE TO OTHER APPLICATIONS

This application claims priority to U.S. Provisional Patent Application No. 61/200,838 entitled DATA DEPENDENT GAIN TO IMPROVE PERFORMANCE UNDER ADJACENT TRACK ERASURE filed Dec. 3, 2008 which is incorporated herein by reference for all purposes.

BACKGROUND OF THE INVENTION

Adjacent track erasure (ATE), sometimes called adjacent track encroachment, is an issue faced by magnetic data storage systems because of high tracks per inch (TPI) drive integration. Since the areal density of hard disk drives has been increasing by about 60-100% annually in recent years, the track density measured by TPI has increased substantially.

ATE occurs when track(s) adjacent to a track of interest (also referred to as a center track) are written to multiple times. As a result, the center track signal (on-track condition) will be contaminated with white noise. Also, the average amplitude of the center track may drop due to being partially erased. The signal amplitude drop and/or noise enhancement of the center track signal leads to significant signal to noise ratio (SNR) degradation, which translates to a drop in bit error rate (BER).

FIG. 1A is a diagram showing an example of a magnetic disk. In that example, disk 150 includes center track 154 and adjacent tracks 152a and 152b. In that example, writing to adjacent tracks 152a and/or 152b affects the information stored in center track 154 even if center track 154 is not intentionally or directly written to. It would be desirable to develop techniques that address the affects of ATE.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
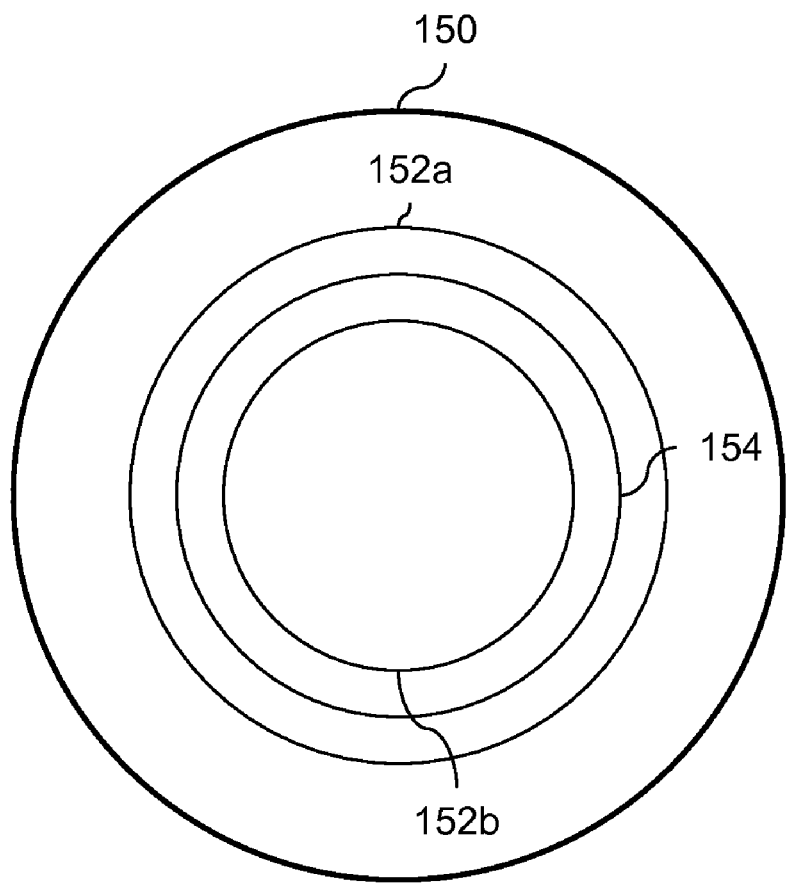
FIG. 1A is a diagram showing an example of a magnetic disk.
Figure 1B:
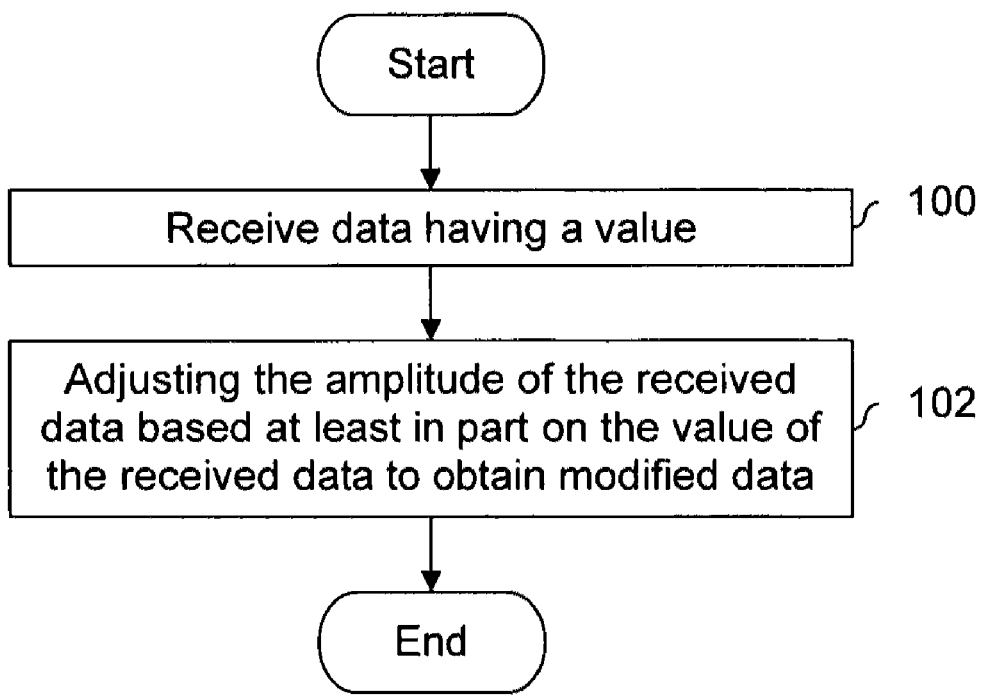
FIG. 1B is a flowchart illustrating an embodiment of a process to perform data pattern dependent amplitude adjustment.

FIG. 1B is a flowchart illustrating an embodiment of a process to perform data pattern dependent amplitude adjustment. In the example shown, data having a value is received at 100. The value of the data is also referred to as a data pattern. In some embodiments, the received data is digital data (e.g., as opposed to analog data). In some embodiments, the data received at 100 is associated with data read back from a storage device (e.g., from Flash storage or magnetic disk storage). In various embodiments, the data received at 100 has already been processed by one or more components in a read channel (i.e., a processor associated with processing data read back from storage) such as a continuous timing filter (CTF), an analog to digital (ADC) converter, and/or an equalized filter (e.g., a finite impulse response (FIR) filter).

At 102, the amplitude of the received data is adjusted based at least in part on the value of the received data to obtain modified data. In some embodiments, adjusting the amplitude at 102 includes using an early stage detector to make a decision, and then selecting a gain to modify the received signal where the gain is selected based at least in part on the decision from the early stage detector. In one example, the received data is associated with 4-bit data such that there are 16 possible values the received data can have. In some embodiments, there are 16 different gain values, each gain value of which corresponds to one of the 16 possible data values. In some other embodiments, two or more different values of the received data use the same gain value. For example, there may be a first gain value for "high frequency" data patterns (e.g., when the received data is 1010 or 0101), a second gain value for "low frequency" data patterns (e.g., when the received data is 1111 or 0000), and a third gain value for "medium frequency" data patterns or the remaining data patterns. Although some examples use 16 different gain values, it is merely an example. In various other embodiments there are (for example) 5 bits (corresponding to 32 different values), 6 bits, etc.

In some applications, the adjustment performed at 102 is used to correct for adjacent track erasure (ATE) where—depending upon the pattern (i.e., the value of the data stored and later read back)—the amount of correction varies. Table 1 shows how writing to an adjacent track can affect a track of interest:

TABLE 1

Viterbi BERs before and after writing to adjacent tracks 1000 times.

|  | On-Track | ATE 1000 |
|---|---|---|
| Viterbi BER | 2.3e−4 | 2.76e−3 |
| SNR | 14.35 dB | 12.66 dB |
| Media noise percentage | 87.8% | 89.5% |

In Table 1, two tracks adjacent to a track of interest are written to 1000 times. The system used to obtain the example error rates above used Hard Disk Drive tester. As shown above, the Viterbi bit error rate (BER) increases from 2.3e-4 (On-Track) to 2.76e-3 (after writing 1000 times to adjacent tracks). The center track performance degradation is due to the fact that ATE partially erases the center track signal which leads to the performance degradation of center track.

The table below shows gain values and gain ratios for various values of 5-bit data.

TABLE 2

Example amplitude values and amplitude ratios for 5-bit data pattern

| Data Pattern | On-Track | ATE | Ratio |
|---|---|---|---|
| 00000 | −15.83 | −13.41 | 1.18 |
| 00001 | −18.37 | −16.11 | 1.14 |
| 00010 | −7.85 | −6.57 | 1.19 |
| 00011 | −10.39 | −8.99 | 1.16 |
| 00100 | 3.47 | 4.48 | 0.77 |
| 00101 | 1.24 | 2.16 | 0.58 |
| 00110 | 10.98 | 10.75 | 1.02 |
| 00111 | 8.78 | 8.36 | 1.05 |
| 01000 | −7.97 | −6.70 | 1.19 |
| 01001 | −10.13 | −9.05 | 1.12 |
| 01010 | 0.75 | 0.66 | 1.14 |
| 01011 | −1.54 | −1.96 | 0.78 |
| 01100 | 11.30 | 10.83 | 1.04 |
| 01101 | 9.05 | 8.33 | 1.09 |
| 01110 | 19.01 | 17.48 | 1.09 |
| 01111 | 16.31 | 14.54 | 1.12 |
| 11111 | 15.10 | 12.57 | 1.20 |
| 11110 | 18.06 | 15.48 | 1.17 |
| 11101 | 7.49 | 5.90 | 1.27 |
| 11100 | 9.87 | 8.45 | 1.17 |
| 11011 | −3.81 | −4.91 | 0.78 |
| 11010 | −1.78 | −2.53 | 0.70 |
| 11001 | −12.34 | −12.00 | 1.03 |
| 11000 | −10.17 | −9.46 | 1.08 |
| 10111 | 7.26 | 5.88 | 1.23 |
| 10110 | 9.66 | 8.50 | 1.14 |
| 10101 | −1.24 | −1.08 | 1.15 |
| 10100 | 1.06 | 1.57 | 0.67 |
| 10011 | −12.13 | −11.50 | 1.05 |
| 10010 | −9.69 | −9.06 | 1.07 |
| 10001 | −19.89 | −18.18 | 1.09 |
| 10000 | −17.27 | −15.48 | 1.12 |

As shown in Table 2, adjacent track erasure affects the amplitude of a signal/data differently depending upon the value of the signal/data stored in the center signal. The amplitude of data patterns such as 00000, 11111, 01111, and 10000 decreases (e.g., amplitude ratios of 1.18, 1.20, 1.12, and 1.12 respectively), the amplitude of data patterns such as 01010 and 00101 increases (e.g., amplitude ratios of 0.77 and 0.58, respectively), and the amplitude of data patterns such as 00110, 11001, 11000 remain relatively unchanged (e.g., amplitude ratios of 1.02, 1.03, and 1.08, respectively). In general, the first group can be generally classified as low frequency data patterns (in that they do not change much when represented in bits), the second group can be generally classified as medium frequency data patterns, and the third group can be generally classified as high frequency data patterns.

In some embodiments, a simulation is performed to obtain a collection of amplitude values and amplitude ratios as shown in Table 2. In some embodiments, these obtained amplitude ratios are used to correct the amplitude of a data signal based on the data pattern. For example, using Table 2, if the data pattern 11111 is received, it would be known or assumed the amplitude of that signal/data had been scaled down and to obtain the original amplitude, a corrective gain of 1.20 would be applied (e.g., multiplied) to the amplitude of the received data signal.

Although some examples described herein discuss using the disclosed technique in a storage application to compensate for ATE, the technique disclosed herein is not necessarily limited to that application or scenario. In some other embodiments, pattern-dependent amplitude adjustment is used to compensate for some other effect (e.g., besides ATE) and/or improve performance in some other application (e.g., besides a storage application).

Figure 2:
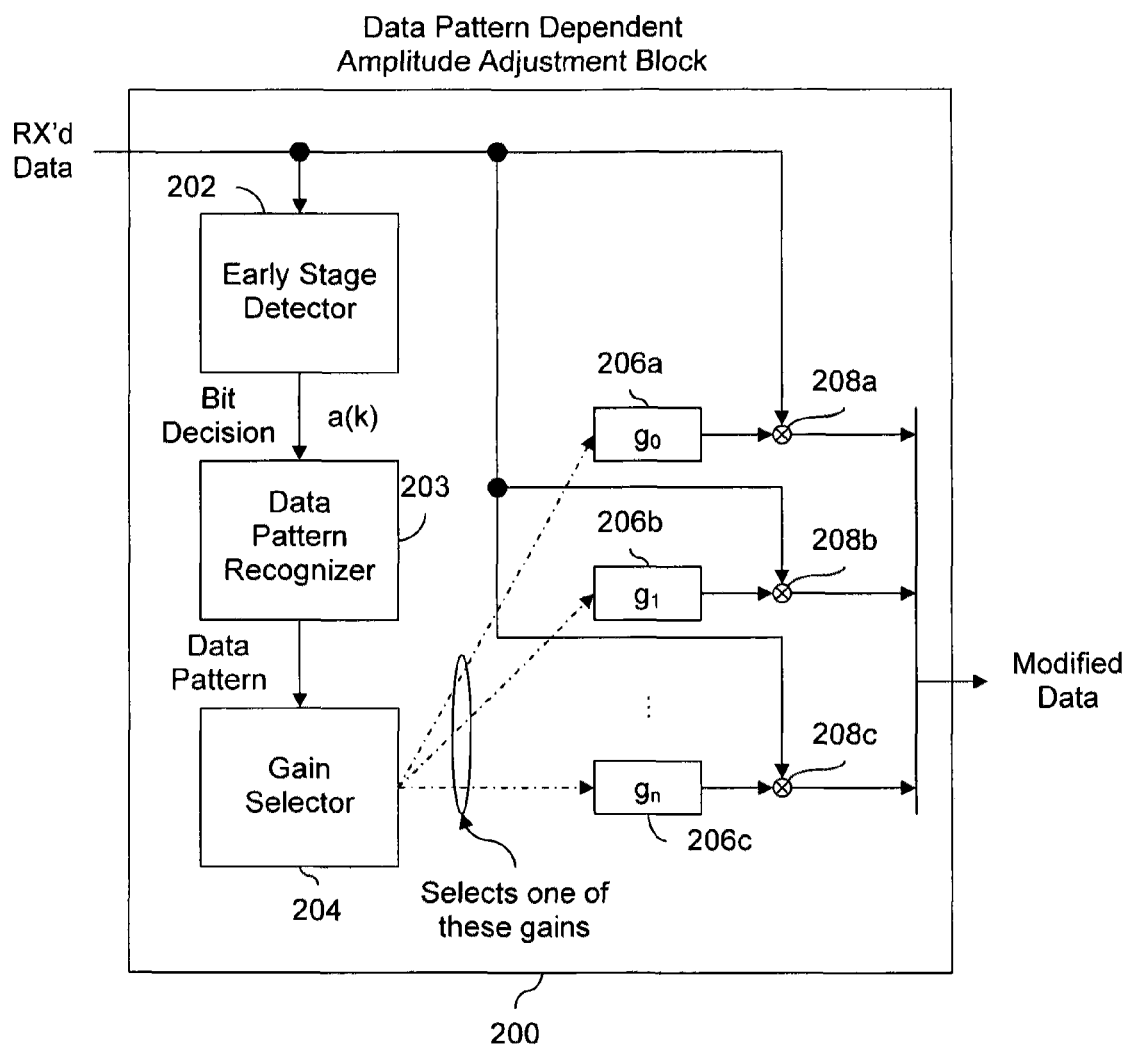
FIG. 2 is a block diagram showing an embodiment of a data pattern dependent amplitude adjustment block.

FIG. 2 is a block diagram showing an embodiment of a, data pattern dependent amplitude adjustment block. In the example shown, block 200 performs the process shown in FIG. 1B. In some other embodiments, the process of FIG. 1B is implemented using some other system.

Block 200 receives data (also referred to as received data). In some embodiments, the data is received from an equalized filter, such as an FIR filter. The received data is passed to early stage detector 202. An early stage detector is any detector which has relatively low latency (i.e., it makes a decision relatively quickly). In various embodiments, early stage detector 202 is a threshold slicer, a decision feed-back equalizer (DFE), a (simplified) maximum-likelihood (ML) detector, or a maximum a priori (MAP) detector. Detector 202 outputs bit decisions a(k).

The bit decisions a(k) are passed from early stage detector 202 to data pattern recognizer 203. In this example, bit decisions are hard decisions (e.g., 0 or 1) and are stored until enough information is gathered to output a data pattern. For example, the case of a 4-bit data pattern, the possible data patterns output by data pattern recognizer 203 include 0000, 0001, 0010, . . . , 1110, and 1111.

The data pattern is passed from data pattern recognizer 203 to gain selector 204. Based on the data pattern, gain selector 204 selects one of a plurality of gain values stored in gain registers 206a-206c. A gain value corresponding to a first data pattern is stored in register 206a, a gain value corresponding to a second data pattern is stored in register 206b, and so on. In this particular example, gain values are stored in registers (and are therefore programmable) and there is (if desired) a different gain value for each data pattern.

The selected gain is multiplied with the received data using one of multipliers 208a-208c. For example, if the data pattern is a first possible value, the gain value $g_0$ stored in register 206a is multiplied to the received data using a first multiplier 208a and the product is output as the modified data. If the data pattern is a second possible value, the gain value $g_1$ stored in register 206b is multiplied to the received data using a second multiplier 208b and that product is output as the modified data. In some embodiments, an n-to-1 multiplexer is coupled to multipliers 208a-208c.

Figure 3:
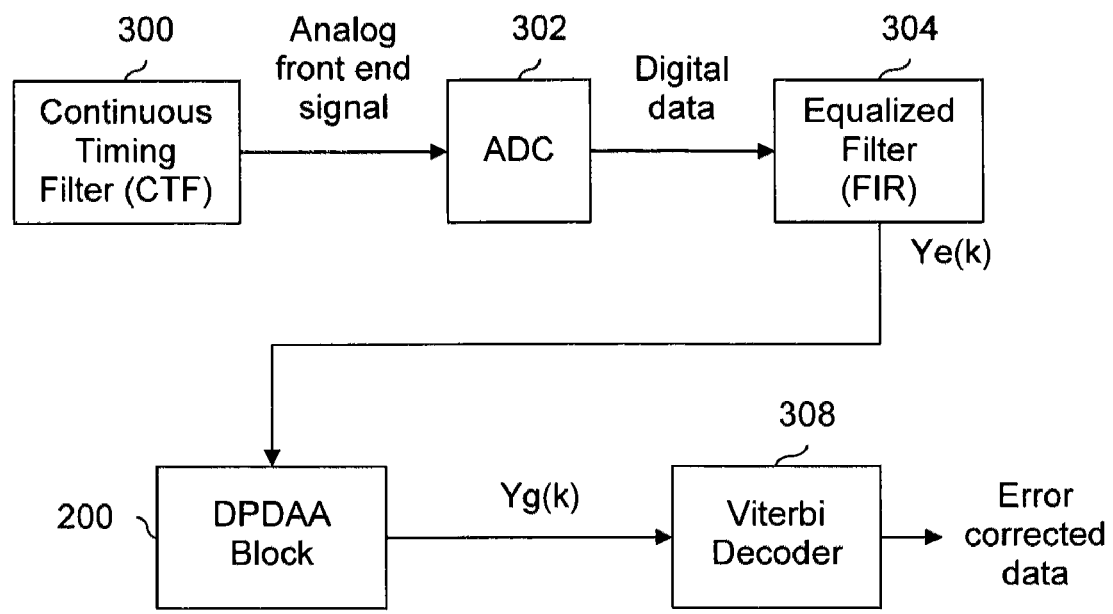
FIG. 3 is a system diagram showing an embodiment of a read processor that includes a data pattern dependent amplitude adjustment block.

FIG. 3 is a system diagram showing an embodiment of a read processor that includes a data pattern dependent amplitude adjustment block. In the example shown, the data pattern dependent amplitude adjustment block shown in FIG. 2 is a component of the system shown. In some embodiments, some other data pattern dependent amplitude adjustment block is included as a component. In some embodiments, the data pattern dependent amplitude adjustment block show in FIG. 2 is included in a system other than the example shown in FIG. 3.

An input signal is passed to continuous timing filter (CTF) 300. Continuous timing filter 300 does the signal shaping and passes filtered signal to analog to digital converter (ADC) 302. ADC 302 converts the analog signal passed to it into digital form and outputs digital data. The digital data is passed to equalized filter 304 which in this example is a finite impulse response (FIR) filter. Equalized filter 304 performs the least mean square signal equalization and outputs Ye(k) to data pattern dependent amplitude adjustment block 200 which operates (at least in this example) as shown in FIG. 2. Ye(k) is also referred to as equalized samples.

Data pattern dependent amplitude adjustment block 200 outputs amplitude-adjusted data Yg(k) to Viterbi decoder 308 which in turn outputs error corrected data.

Performance of a data storage system is based on performance of any error-correction codes (ECCs), which (in those embodiments that include them) is directly affected by Viterbi detector performance. For other systems (e.g., that do not include a data pattern dependent amplitude adjustment block), a Viterbi detector finds the maximum-likelihood sequence for a given input sequence Ye(k) from an equalized filter (FIR) output. For those other systems, the equation of Viterbi detector can be simply written in such way:

$$\min_j \left( \sum_k \frac{(Y_e(k) - Yt(j))^2}{sigma^2} \right) \quad (1)$$

where Ye(k) is the output of the FIR and Yt(j) is the branch metric value for Viterbi detector (e.g., j=0 to 31 different values corresponding to 32 branch metrics in a 16-state Viterbi detector. k is the index of the FIR output.

As a result of adjacent track erasure condition and/or other effects, the channel affects one data pattern written in storage differently than another data pattern (see, e.g., Table 2), which makes the Ye(k) dependent on the particular data pattern stored.

Instead of Equation 1, for the technique proposed herein the processing of the Viterbi detector can be described as:

$$\min_j \left( \sum_k \frac{(Y_g(k, j) - Yt(j))^2}{sigma^2} \right) = \min_j \left( \sum_k \frac{(g_j \times Y_e(k) - Yt(j))^2}{sigma^2} \right) \quad (2)$$

Or alternatively:

$$\min_j \left( \sum_k \frac{(Y_g(k, j) - Yt(j))^2}{sigma^2} \right) = \min_j \left( \sum_k \frac{(Y_e(k) - Yt(j)/g_j)^2}{(sigma/g_j)^2} \right) \quad (3)$$

In some embodiments, a data pattern dependent amplitude adjustment block perform some other processing or functions in addition to those shown in FIGS. 1B and 2. The following figures show some other embodiments of a data pattern dependent amplitude adjustment block.

Figure 4:
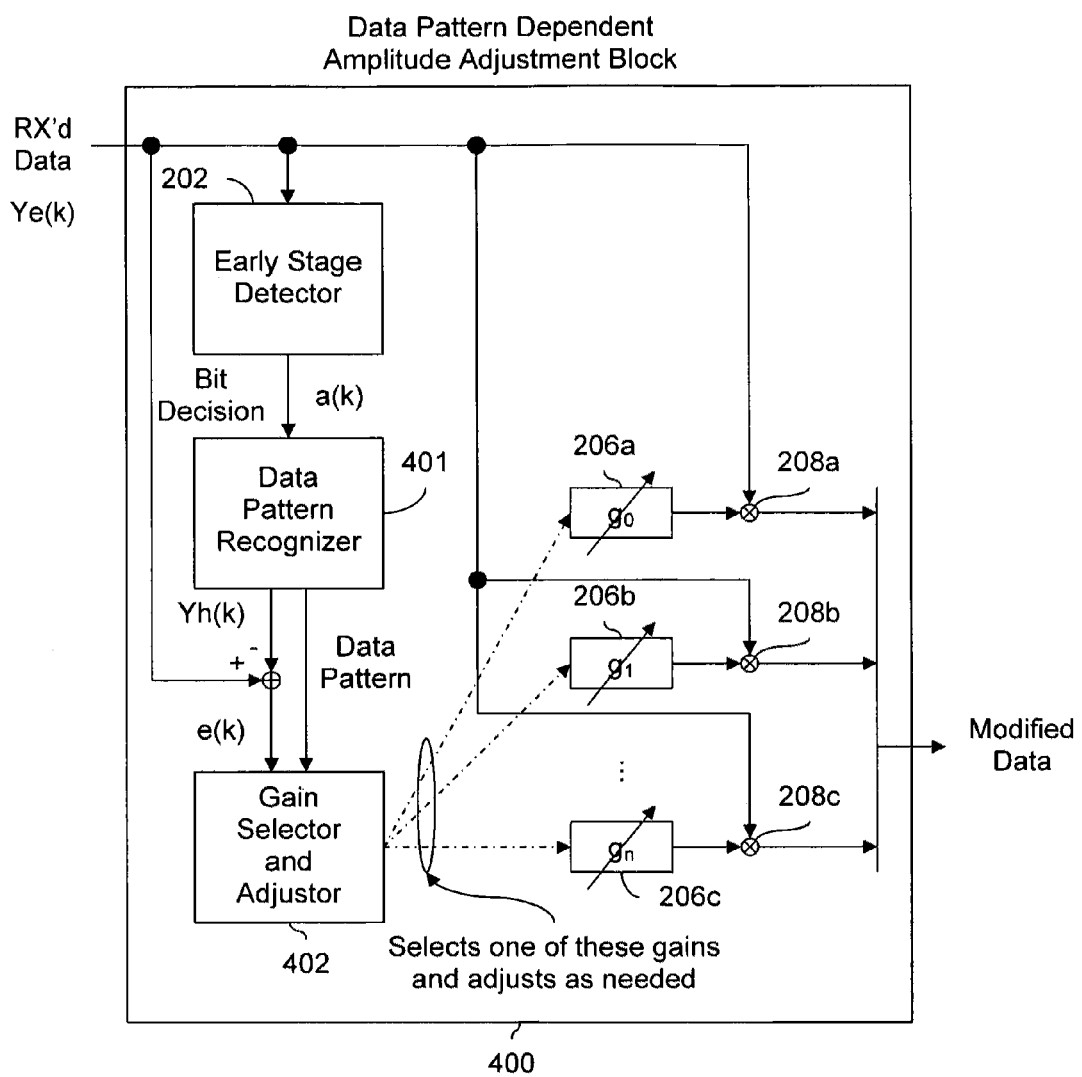
FIG. 4 is a block diagram showing an embodiment of a data pattern dependent amplitude adjustment block configured to update gain values.

FIG. 4 is a block diagram showing an embodiment of a data pattern dependent amplitude adjustment block configured to update gain values. In the example shown, components having the same functionality as that shown in the embodiment of FIG. 2 are shown with the same reference numbers. In this particular embodiment, data pattern dependent amplitude adjustment block 400 is configured to update the gain values stored in registers 206a-206c (not necessarily all at the same time) in addition to selecting a gain to be applied to the received data.

Data pattern recognizer 401 is configured to combine the decision bit a(k) with previous bit decisions a(k−1), a(k−2), . . . , a(k−i) to reconstruct a desired equalized filter output Yh(k). Yh(k) is a "perfect" value without noise whereas a data pattern is used to identify a (e.g., high or low frequency) pattern as shown (for example) in Table 2. A detection error is determined by taking the difference between Ye(k) (i.e., the data received by block 400) and Yh(k). In other words, e(k)=Ye(k)−Yh(k). Data pattern recognizer 401 is also configured to output a data pattern.

The data pattern and the detection error e(k) are passed to gain selector and adjustor 402 which uses them to adapt or otherwise adjust the gain coefficients g1, g2, . . . , gj, . . . , gn, where n=$2^{i+1}$. In addition to updating the gain values stored in registers 206a-206c, block 402 is configured to select a gain to multiply the received data with as described in FIG. 2. In some embodiments, the gain coefficients g1, g2, . . . , gj, . . . , gn are initialized to 1's. In some embodiments, the gain is updated using the following equation:

$$g_j(k) = g_j(k-1) + mu \times e(k) \times y_e(k) \quad (4)$$

where mu is a (e.g., programmable) adaptive step size and j ranges from 0 to n where n equals the number of branches in a (e.g., subsequent) Viterbi detector.

In some embodiments, the gain is updated using the following equation:

$$g_j(k) = g_j(k-1) + mu \times e(k) \times y_h(k) \quad (5)$$

In some embodiments, the selection of Equation (4), Equation (5), or some other alternate depends on the channel condition. In one example: for a given condition, Equation (4) is tested and then Equation (5) is tested; whichever gives the best performance is used to adapt the circuit for that particular channel condition.

In the two example gain update equations above, for each received Ye(k) (and corresponding a(k), a(k−1), . . . , a(k−i)) only one gj is updated at a time (e.g., using one of the two equations above) where j=$2^i$×a(k−i)+$2^{i-1}$×a(k−i+1)+ . . . +2×a(k−1)+a(k).

Figure 5:
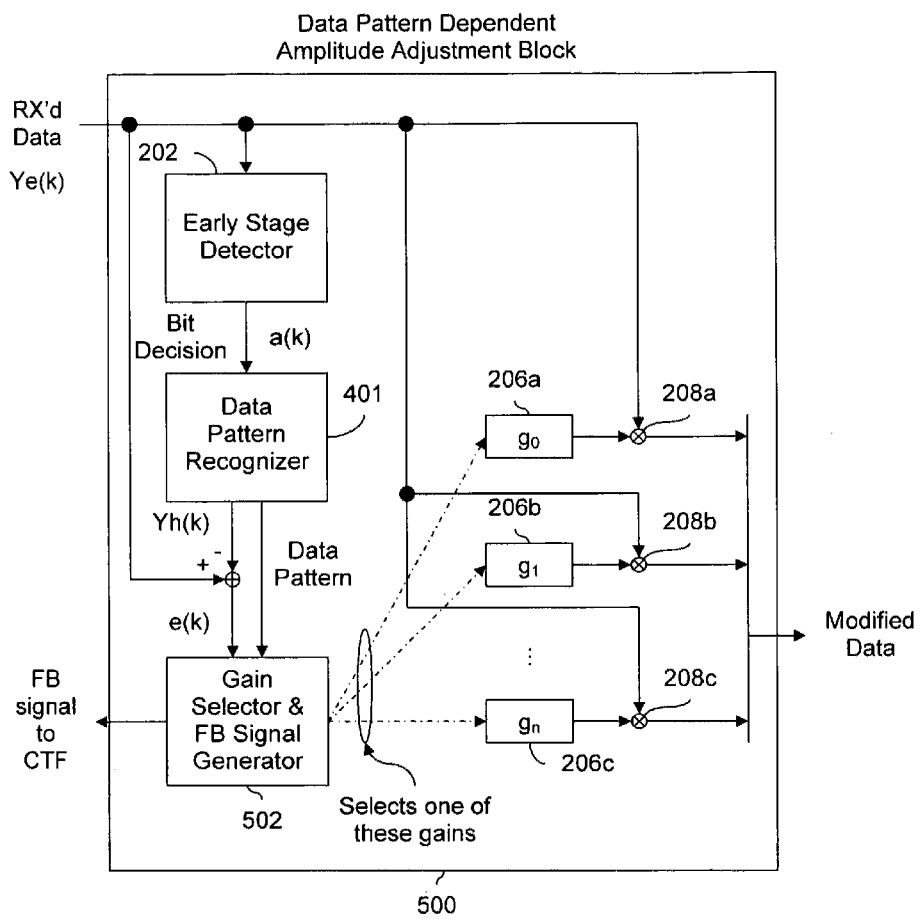
FIG. 5 is a block diagram showing an embodiment of a data pattern dependent amplitude adjustment block configured to generate a feedback signal to a continuous timing filter.

FIG. 5 is a block diagram showing an embodiment of a data pattern dependent amplitude adjustment block configured to generate a feedback signal to a continuous timing filter. In the example shown, data pattern dependent amplitude adjustment block 500 is configured to select a gain to apply based on a data pattern and/or a bit decision as described above. In some embodiments, the processing shown here (e.g., generating a feedback signal to a continuous timing filter) is combined with processing shown in some other embodiment (e.g., adjusting one or more gain values based on a detection error and/or bit decision sequence).

In the example shown, data pattern recognizer 401 outputs a desired equalized filter output, Yh(k), and a data pattern as in FIG. 4. In this example, gain selector and feedback signal generator 502 calculates the statistics of decision errors for each individual data pattern (e.g., comprising of the sequence of a(k), a(k−1), . . . , a(k−i)). In some embodiments, a programmable threshold is used to determine whether block 500 feeds back channel statistics to a continuous time filter (CTF) block (not shown) to adjust cutoff frequency and boost of CTF to (re)shape the CTF output. When so configured, the Ye(k) signal output by an equalized filter (not shown) is reshaped as the output of the CTF (Yc(k)) changes. In various embodiments, this technique of adjusting a CTF via a feedback loop can be combined with and/or used as an alternative to a data dependent gain circuit to achieve even better read channel performance.

Figure 6:
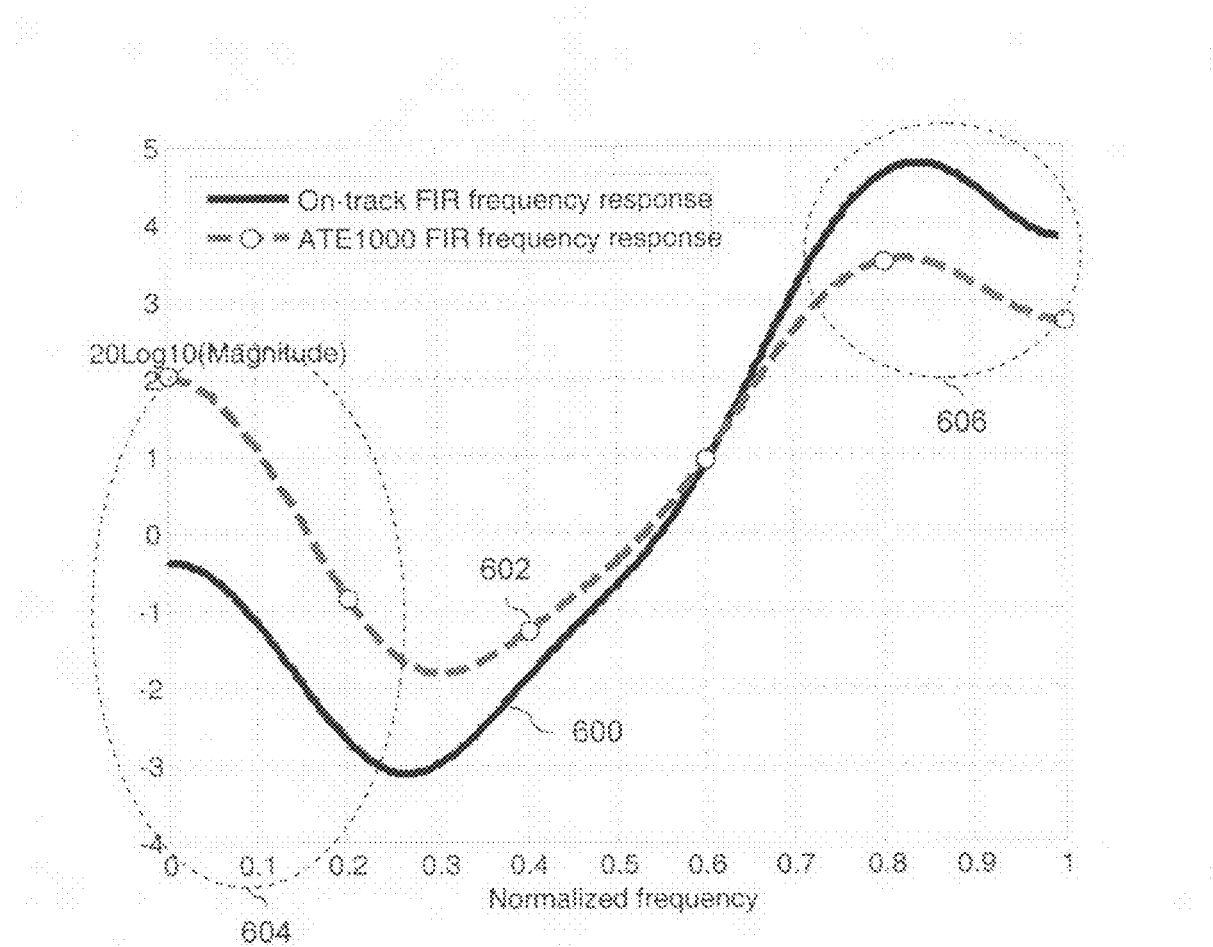
FIG. 6 is a diagram showing a frequency response graph.

FIG. 6 is a diagram showing a frequency response graph. In the example shown, line 600 corresponds to an on-track condition and line 602 corresponds to writing to adjacent tracks 1000 times. The frequency is normalized to the Nyquist frequency in FIG. 6.

In low frequency range 604 the magnitude of the signal drops when the adjacent tracks are written and in high frequency range 606 the magnitude of the signal increases when the adjacent tracks are written. To compensate, low frequency components are boosted and high frequency component are reduced in order to reshape ATE condition channel environment to be similar as on-track channel environment. In the example of FIG. 5, that reshaping is performed at least in part by perturbing CTF parameters such as boost and/or cutoff frequency. The error correction code performance is shown to improve more than one order under ATE condition in an experiment.

Figure 7:
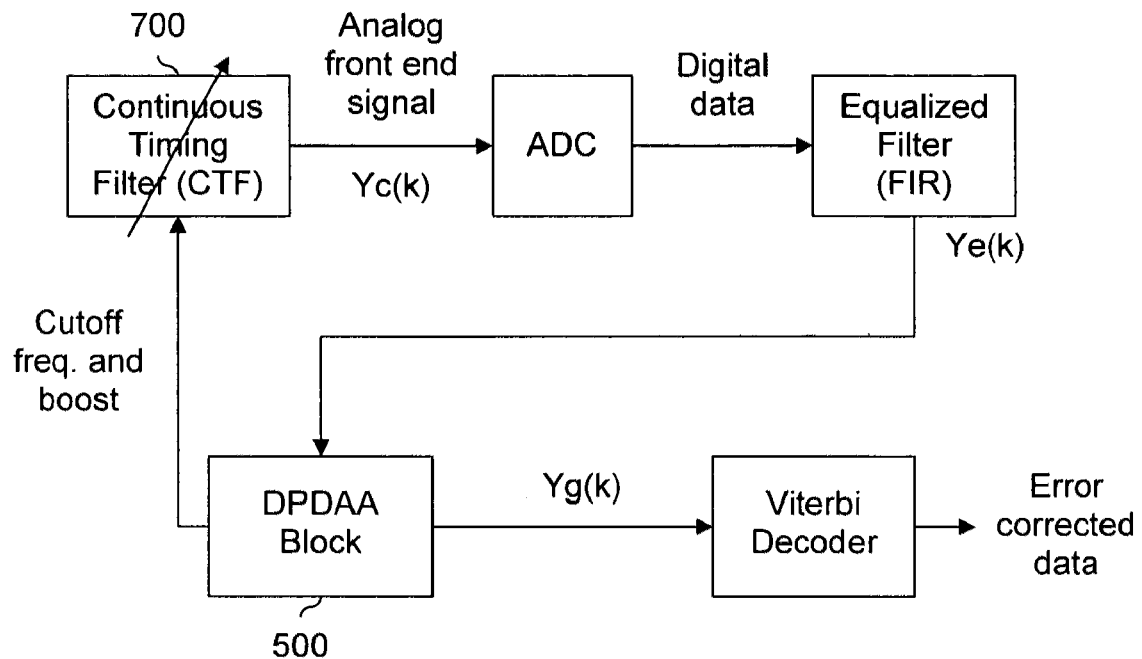
FIG. 7 is a system diagram showing an embodiment of a read processor that includes a feedback loop.

FIG. 7 is a system diagram showing an embodiment of a read processor that includes a feedback loop. In the example shown, the data pattern dependent amplitude adjustment block shown in FIG. 5 is included as a component. In the example shown, data pattern dependent amplitude adjustment block 500 generates a cutoff frequency and boost signal which is passed to CTF 700 as part of a feedback loop.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for processing data, comprising:
   receiving a digital signal associated with data stored in a first storage location, wherein the digital signal includes noise associated with a second storage location;
   processing the digital signal using a detector to obtain a decision;
   selecting a gain from a plurality of gain values based at least in part on the decision, wherein in the event the decision is associated with low-frequency data, an amplifying gain value is selected and in the event the decision is associated with high-frequency data, an attenuating gain value is selected; and
   using a processor to remove the noise associated with the second storage location from the digital signal based at least in part on the decision, including by:
      in the event the decision is associated with low-frequency data, amplifying the digital signal using the amplifying gain value; and
      in the event the decision is associated with high-frequency data, attenuating the digital signal using the attenuating gain value.

2. The method of claim 1, wherein the digital signal has been processed by one or more of the following: a continuous timing filter (CTF), an analog to digital converter (ADC), an equalized filter, or a finite impulse response (FIR) filter.

3. The method of claim 1, wherein the digital signal includes data that has been stored in Flash storage or magnetic disk storage.

4. The method of claim 1, wherein the detector includes at least one of the following: a threshold slicer, a decision feedback equalizer (DFE), a maximum-likelihood (ML) detector, or a maximum a priori (MAP) detector.

5. The method of claim 1, wherein:
   selecting further includes in the event the decision is associated with medium-frequency data, selecting a third gain value which is greater than the attenuating gain value and less than the amplifying gain value; and
   using the processor to remove noise further includes in the event the decision is associated with medium-frequency data, adjusting the digital signal using the third gain value.

6. The method of claim 1, wherein:
   the amplifying gain value is adjustable; and
   the method further includes:
      determining an ideal signal based at least in part on the decision;
      determining an error corresponding to a difference between the ideal signal and the digital signal; and
      adjusting the amplifying gain value based at least in part on the error.

7. The method of claim 1, wherein:
   the attenuating gain value is adjustable; and
   the method further includes:
      determining an ideal signal based at least in part on the decision;
      determining an error corresponding to a difference between the ideal signal and the digital signal; and
      adjusting the attenuating gain value based at least in part on the error.

8. A system for processing data, comprising:
   an interface configured to receive a digital signal associated with data stored in a first storage location, wherein the digital signal includes noise associated with a second storage location;
   a detector configured to process the digital signal to obtain a decision;
   a selector configured to select a gain from a plurality of gain values based at least in part on the decision, wherein in the event the decision is associated with low-frequency data, an amplifying gain value is selected and in the event the decision is associated with high-frequency data, an attenuating gain value is selected; and
   a processor configured to remove the noise associated with the second storage location from the digital signal based at least in part on the decision;
      in the event the decision is associated with low-frequency data, amplifying the digital signal using the amplifying gain value; and
      in the event the decision is associated with high-frequency data, attenuating the digital signal using the attenuating gain value.

9. The system of claim 8, wherein the digital signal has been processed by one or more of the following: a continuous timing filter (CTF), an analog to digital converter (ADC), an equalized filter, or a finite impulse response (FIR) filter.

10. The system of claim 8, wherein the digital signal includes data that has been stored in Flash storage or magnetic disk storage.

11. The system of claim 8, wherein the detector includes at least one of the following: a threshold slicer, a decision feedback equalizer (DFE), a maximum-likelihood (ML) detector, or a maximum a priori (MAP) detector.

12. The system of claim 8, wherein:

the selector is further configured to: in the event the decision is associated with medium-frequency data, select a third gain value which is greater than the attenuating gain value and less than the amplifying gain value; and the processor is further configured to remove noise by: in the event the decision is associated with medium-frequency data, adjust the digital signal using the third gain value.

13. The system of claim 8, wherein:

the amplifying gain value is adjustable; and the system further includes:
- a processor configured to:
  - determine an ideal signal based at least in part on the decision; and
  - determine an error corresponding to a difference between the ideal signal and the digital signal; and
- a gain adjustor configured to adjust the amplifying gain value based at least in part on the error.

14. The system of claim 8, wherein:

the attenuating gain value is adjustable; and the system further includes:
- a processor configured to:
  - determine an ideal signal based at least in part on the decision; and
  - determine an error corresponding to a difference between the ideal signal and the digital signal; and
- a gain adjustor configured to adjust the attenuating gain value based at least in part on the error.

15. A computer program product for processing data, the computer program product being embodied in a non-transitory computer readable storage medium and comprising computer instructions for:

receiving a digital signal associated with data stored in a first storage location, wherein the digital signal includes noise associated with a second storage location;

processing the digital signal using a detector to obtain a decision;

selecting a gain from a plurality of gain values based at least in part on the decision, wherein in the event the decision is associated with low-frequency data, an amplifying gain value is selected and in the event the decision is associated with high-frequency data, an attenuating gain value is selected; and removing the noise associated with the second storage location from the digital signal based at least in part on the decision, including by:
- in the event the decision is associated with low-frequency data, amplifying the digital signal using the amplifying gain value; and
- in the event the decision is associated with high-frequency data, attenuating the digital signal using the attenuating gain value.

16. The computer program product of claim 15, wherein:

the computer instructions for selecting further include computer instructions for: in the event the decision is associated with medium-frequency data, selecting a third gain value which is greater than the attenuating gain value and less than the amplifying gain value; and the computer instructions for removing noise further include computer instructions for: in the event the decision is associated with medium-frequency data, adjusting the digital signal using the third gain value.

17. The computer program product of claim 15, wherein:

the amplifying gain value is adjustable; and the computer program product further includes computer instructions for:
- determining an ideal signal based at least in part on the decision;
- determining an error corresponding to a difference between the ideal signal and the digital signal; and
- adjusting the amplifying gain value based at least in part on the error.

18. The computer program product of claim 15, wherein:

the attenuating gain value is adjustable; and the computer program product further includes computer instructions for:
- determining an ideal signal based at least in part on the decision;
- determining an error corresponding to a difference between the ideal signal and the digital signal; and
- adjusting the attenuating gain value based at least in part on the error.

* * * * *

UNITED STATES PATENT AND TRADEMARK OFFICE
CERTIFICATE OF CORRECTION

PATENT NO.        : 8,184,390 B1                    Page 1 of 1
APPLICATION NO.   : 12/592343
DATED             : May 22, 2012
INVENTOR(S)       : Xia et al.

It is certified that error appears in the above-identified patent and that said Letters Patent is hereby corrected as shown below:

In the Claims

Column 8, Line 50:
delete ";" after decision

Column 8, Line 50:
insert -- , including by: -- after decision

Signed and Sealed this
Twenty-seventh Day of May, 2014

Michelle K. Lee
*Deputy Director of the United States Patent and Trademark Office*